United States Patent
DiPietro et al.

(10) Patent No.: US 7,811,499 B2
(45) Date of Patent: Oct. 12, 2010

(54) METHOD FOR HIGH DENSITY DATA STORAGE AND READ-BACK

(75) Inventors: Richard Anthony DiPietro, Campbell, CA (US); Urs T. Duerig, Rueschlikon (CH); Jane Elizabeth Frommer, San Jose, CA (US); Bernd Walter Gotsmann, Horgen (CH); Erik Christopher Hagberg, Evansville, IN (US); James Lupton Hedrick, Pleasanton, CA (US); Armin W. Knoll, Zurich (CH); Teddie Peregrino Magbitang, San Jose, CA (US); Robert Dennis Miller, San Jose, CA (US); Russell Clayton Pratt, Los Gatos, CA (US); Charles Gordon Wade, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 1120 days.

(21) Appl. No.: 11/474,678

(22) Filed: Jun. 26, 2006

(65) Prior Publication Data

US 2007/0296101 A1 Dec. 27, 2007

(51) Int. Cl.
  *B29C 45/76* (2006.01)
(52) U.S. Cl. .................... 264/293; 264/40.1
(58) Field of Classification Search ............ 264/293, 264/40.1
  See application file for complete search history.

(56) References Cited

U.S. PATENT DOCUMENTS

| | | | |
|---|---|---|---|
| 4,708,994 A | 11/1987 | Wong | |
| 4,962,162 A | 10/1990 | Kosuda et al. | |
| 4,975,358 A * | 12/1990 | Sonnenschein et al. | 430/270.14 |
| 5,138,028 A | 8/1992 | Paul et al. | |
| 5,199,021 A | 3/1993 | Hatanaka et al. | |
| 5,255,259 A | 10/1993 | Hatanaka et al. | |
| 5,268,444 A | 12/1993 | Jensen et al. | |
| 5,290,908 A | 3/1994 | D'Alelio | |
| 5,312,994 A | 5/1994 | Bryant et al. | |
| 5,375,114 A | 12/1994 | Hatanaka et al. | |
| 5,412,066 A | 5/1995 | Hergenrother et al. | |
| 5,567,800 A | 10/1996 | Hergenrother et al. | |
| 5,681,967 A | 10/1997 | Hergenrother et al. | |

(Continued)

FOREIGN PATENT DOCUMENTS

EP 05404018.2 1/2005

OTHER PUBLICATIONS

Vettiger, et al.; The "Millipede"—Nanotechnology Entering Data Storage; IEEE Transactions on Nanotechnology, vol. 1, No. 1; Mar. 2002; pp. 39-55.
Office Action (Mail Date Jan. 27, 2009) for U.S. Appl. No. 12/054,614, filed Mar. 25, 2008; Confirmation No. 6380.
Office Action (Mail Date Jul. 2, 2009) for U.S. Appl. No. 12/054,614, filed Mar. 25, 2008; Confirmation No. 6380.

(Continued)

*Primary Examiner*—Joseph S Del Sole
*Assistant Examiner*—Kimberly A Stewart
(74) *Attorney, Agent, or Firm*—Schmeiser, Olsen & Watts

(57) ABSTRACT

An approach is presented for designing a polymeric layer for nanometer scale thermo-mechanical storage devices. Cross-linked polyaryletherketone polymers are used as the recording layers in atomic force data storage devices, giving significantly improved performance when compared to previously reported cross-linked and linear polymers. The cross-linking of the polyaryletherketone polymers may be tuned to match thermal and force parameters required in read-write-erase cycles.

5 Claims, 4 Drawing Sheets

U.S. PATENT DOCUMENTS

| | | |
|---|---|---|
| 5,760,168 A | 6/1998 | Hergenrother et al. |
| 5,965,687 A | 10/1999 | Jensen |
| 6,121,495 A | 9/2000 | Babb et al. |
| 6,136,949 A | 10/2000 | Earls et al. |
| 6,191,252 B1 | 2/2001 | Jensen |
| 6,236,589 B1 | 5/2001 | Gupta et al. |
| 6,252,001 B1 | 6/2001 | Babb et al. |
| 6,303,733 B1 | 10/2001 | Lau et al. |
| 6,344,523 B1 | 2/2002 | Hawthorne et al. |
| 6,395,907 B1 | 5/2002 | Wright et al. |
| 6,423,811 B1 | 7/2002 | Lau et al. |
| 6,713,590 B2 | 3/2004 | Lau et al. |
| 7,463,572 B2 | 12/2008 | Frommer et al. |
| 7,471,614 B2 | 12/2008 | Frommer et al. |
| 2003/0060590 A1 | 3/2003 | Lau et al. |
| 2004/0158024 A1 | 8/2004 | Lau et al. |
| 2004/0198850 A1 | 10/2004 | Connor et al. |
| 2004/0227263 A1 | 11/2004 | Gorczyca et al. |
| 2005/0020803 A1 | 1/2005 | Machida et al. |
| 2005/0047307 A1 | 3/2005 | Frommer et al. |
| 2005/0050258 A1 | 3/2005 | Frommer et al. |
| 2006/0079609 A1 | 4/2006 | Nishioka et al. |
| 2007/0195682 A1 | 8/2007 | Duerig et al. |
| 2007/0296101 A1 | 12/2007 | DiPietro et al. |
| 2008/0041273 A1 | 2/2008 | Baumgart et al. |

OTHER PUBLICATIONS

Vettiger, et al.; The Millipede—More than one thousand tips for future AFM data storage; IBM Journal of Research and Development, vol. 44 No. 3; May 2000.

\* cited by examiner

METHOD FOR HIGH DENSITY DATA STORAGE AND READ-BACK

FIELD OF THE INVENTION

The present invention relates to the field of high-density data storage and read-back and more specifically to a data storage and read-back medium, a data storage and read-back system, and a data storage and read-back method.

BACKGROUND OF THE INVENTION

Current data storage and imaging methodologies operate in the micron regime. In an effort to store ever more information in ever-smaller spaces, data storage density has been increasing. In an effort to reduce power consumption and increase the speed of operation of integrated circuits, the lithography used to fabricate integrated circuits is pressed toward smaller dimensions and denser imaging. As data storage size increases and density increases and integrated circuit densities increase, there is a developing need for data storage and imaging methodologies that operate in the nanometer regime.

SUMMARY OF THE INVENTION

A first aspect of the present invention is a composition of matter, comprising: a cured resin comprising: one or more polyaryletherketone polymers; and one or more reactive diluents cross-linking the one or more polyaryletherketone polymers; and wherein the cured resin has a glass transition temperature of less than about 220° C.

A second aspect of the present invention is a method, comprising: pushing a probe, heated to at least 100° C., into a layer of a resin formed by curing a layer of one or more polyaryletherketone polymers and one or more reactive diluents; and removing the probe from the layer of the resin, resulting in formation of a deformed region in the layer of the resin.

A third aspect of the present invention is a method, comprising: bringing a thermal-mechanical probe into proximity with a layer of resin multiple times to induce deformed regions at points in the layer of the resin, the resin comprising one or more polyaryletherketone polymers cross-linked by one or more reactive diluent groups, the resin having a glass transition temperature of less than about 220° C., the thermal mechanical probe heated to a temperature of greater than about 100° C., the thermal mechanical probe heating the points in the layer of the resin and thereby writing information in the layer of the resin.

A fourth aspect of the present invention is a data storage device, comprising: a recording medium comprising a layer of a resin overlying a substrate, in which topographical states of the layer of the resin represent data, the resin comprising one or more polyaryletherketone polymers cross-linked by one or more reactive diluent groups, the resin having a glass transition temperature of less than about 220° C., the thermal mechanical probe heated to a temperature of greater than about 100° C., the thermal mechanical probe heating the points in the layer of the resin and thereby writing information in the layer of the resin; and a read-write head having one or more thermo-mechanical probes, each of the one or more thermo-mechanical probes including a resistive region locally exerting heat at a tip of the thermo-mechanical probe in response to electrical current being applied to the one or more thermo-mechanical probes; and a scanning system for scanning the read-write head across a surface of the recording medium.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

Figure 1A:
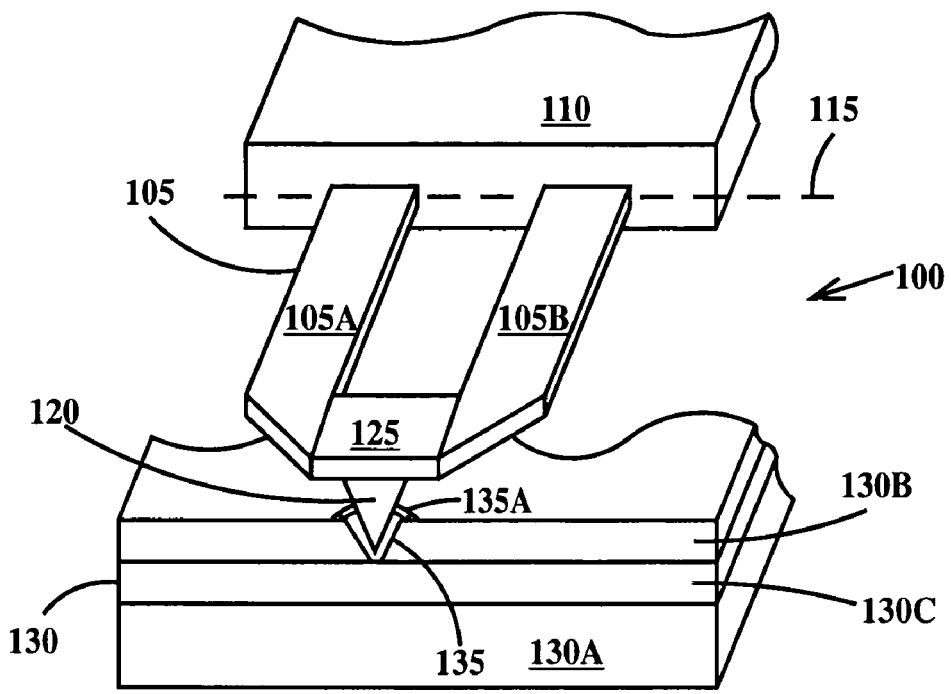
FIGS. 1A through 1C illustrate the structure and operation of a tip assembly for a data storage device including the data storage medium according to the embodiments of the present invention.
Figure 1B:
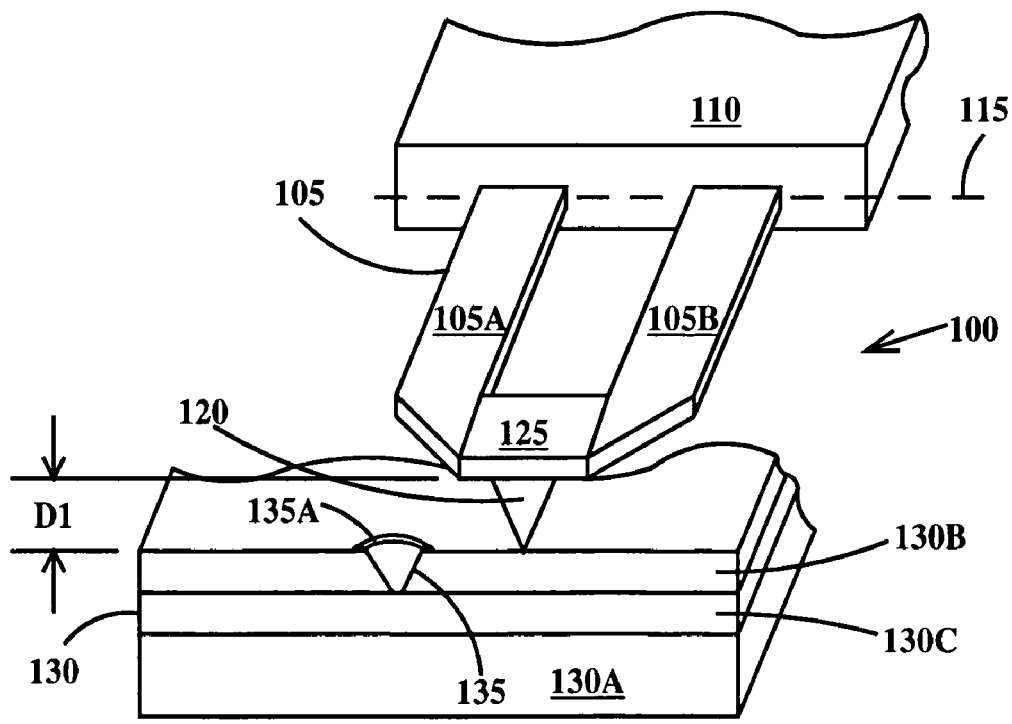
Figure 1C:
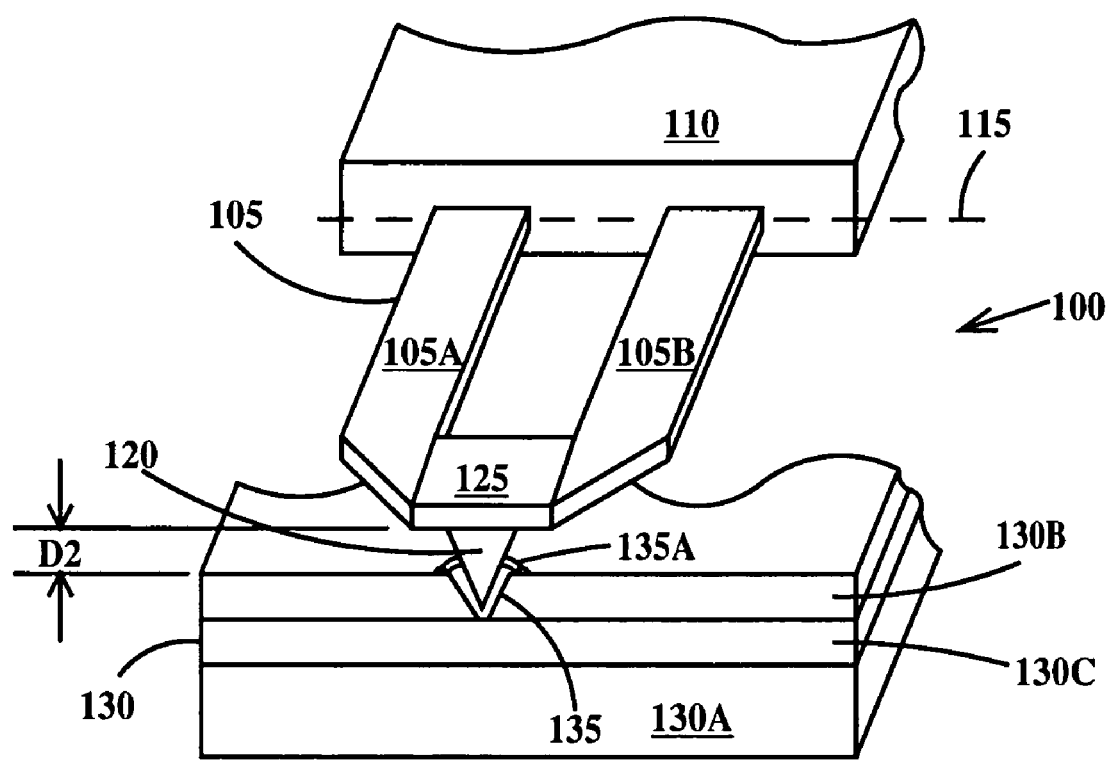

FIGS. 1A through 1C illustrate the structure and operation of a tip assembly 100 for a data storage device including the data storage medium according to the embodiments of the present invention. In FIG. 1A, probe tip assembly 100 includes a U-shaped cantilever 105 having flexible members 105A and 105B connected to a support structure 110. Flexing of members 105A and 105B provides for substantial pivotal motion of cantilever 105 about a pivot axis 115. Cantilever 105 includes an indenter tip 120 fixed to a heater 125 connected between flexing members 105A and 105B. Flexing members 105A and 105B and heater 125 are electrically conductive and connected to wires (not shown) in support structure 110. In one example, flexing members 105A and 105B and indenter tip 120 are formed of highly-doped silicon and have a low electrical resistance, and heater 125 is formed of lightly doped silicon having a high electrical resistance sufficient to heat indenter tip 120, in one example, to between about 100° C. and about 500° C. when current is passed through heater 125. The electrical resistance of heater 125 is a function of temperature.

Also illustrated in FIG. 1A is a storage medium (or a recording medium) 130 comprising a substrate 130A, and a cured polyaryletherketone resin layer 130B. In one example, substrate 130A comprises silicon. Cured polyaryletherketone resin layer 130B may be formed by solution coating, spin coating, dip coating or meniscus coating polyaryletherketone polymer and reactive diluent formulations and performing a curing operation on the resultant coating. In one example, cured polyaryletherketone resin layer 130B has a thickness between about 10 nm and about 500 nm. The composition of cured polyaryletherketone resin layer 130B is described infra. An optional penetration stop layer 130C is shown between cured polyaryletherketone resin layer 130B and substrate 130A. Penetration stop layer 130C limits the depth of penetration of indenter tip 120 into cured polyaryletherketone resin layer 130B.

Turning to the operation of tip assembly 100, in FIG. 1A, an indentation 135 is formed in cured polyaryletherketone resin layer 130B by heating indenter tip 120 to a writing temperature $T_W$ by passing a current through cantilever 105 and pressing indenter tip 120 into cured polyaryletherketone resin layer 130B. Heating indenter tip 120 allows the tip to penetrate the cured polyaryletherketone resin layer 103B forming indentation 135, which remains after the tip is removed. In a first example, the cured polyaryletherketone resin layer 130B is heated by heated indenter tip 120, the temperature of the indenter tip being not greater than about 500° C., to form indentation 135. In a second example, the cured polyaryletherketone resin layer 130B is heated by heated indented tip 120, the temperature of the indenter tip being not greater than about 400° C., to form indentation 135. In a third example, the cured polyaryletherketone resin layer 130B is heated by heated indenter tip 120, the temperature of the indenter tip being between about 200° C. and about 500° C., to form indentation 135. In a fourth example, the cured polyaryletherketone resin layer 130B is heated by heated indenter tip 120, the temperature of the indenter tip being between about 100° C. and about 400° C., to form indentation 135. As indentations 135 are formed, a ring 135A of cured polyaryletherketone resin is formed around the indentation. Indentation 135 represents a data bit value of "1", a data bit value of "0" being represented by an absence of an indentation.

FIGS. 1B and 1C illustrate reading the bit value. In FIGS. 1B and 1C, tip assembly 100 is scanned across a portion of cured polyaryletherketone resin layer 103B. When indenter tip 120 is over a region of cured polyaryletherketone resin layer 130B not containing an indentation, heater 125 is a distance D1 from the surface of the cured polyaryletherketone resin layer (see FIG. 1B). When indenter tip 120 is over a region of cured polyaryletherketone resin layer 130B containing an indentation, heater 125 is a distance D2 from the surface of the cured polyaryletherketone resin layer (see FIG. 1C) because the tip "falls" into the indentation. D1 is greater than D2. If heater 125 is at a temperature $T_R$ (read temperature), which is lower than $T_W$ (write temperature), there is more heat loss to substrate 130A when indenter tip 120 is in an indentation than when the tip is not. This can be measured as a change in resistance of the heater at constant current, thus "reading" the data bit value. It is advantageous to use a separate heater for reading, which is mechanically coupled to the tip but thermally isolated from the tip. A typical embodiment is disclosed in Patent Application EP 05405018.2, 13 Jan. 2005.

"Erasing" (not shown) is accomplished by positioning indenter tip 120 in close proximity to indentation 135, heating the tip to a temperature $T_E$ (erase temperature), and applying a loading force similar to writing, which causes the previously written indent to relax to a flat state whereas a new indent is written slightly displaced with respect to the erased indent. The cycle is repeated as needed for erasing a stream of bits whereby an indent always remains at the end of the erase track. $T_E$ is typically greater than $T_W$. The erase pitch is typically on the order of the rim radius. In a first example, the cured polyaryletherketone resin layer 130B is heated by heated indenter tip 120, the temperature of the indenter tip is not greater than about 500° C., and the erase pitch is 10 nm to eliminate indentation 135. In a second example, the cured polyaryletherketone resin layer 130B is heated by heated indenter tip 120, the temperature of the indenter tip is not greater than about 400° C., and the erase pitch is 10 nm to eliminate indentation 135. In a third example, the cured polyaryletherketone resin layer 130B is heated by heated indenter tip 120, the temperature of the indenter tip is between about 200° C. and about 400° C., and the erase pitch is 10 nm to eliminate indentation 135. In a fourth example, the cured polyaryletherketone resin layer 130B is heated by heated indenter tip 120, the temperature of the indenter tip is between about 200° C. and about 500° C., and the erase pitch is 10 nm to eliminate indentation 135.

Figure 2:
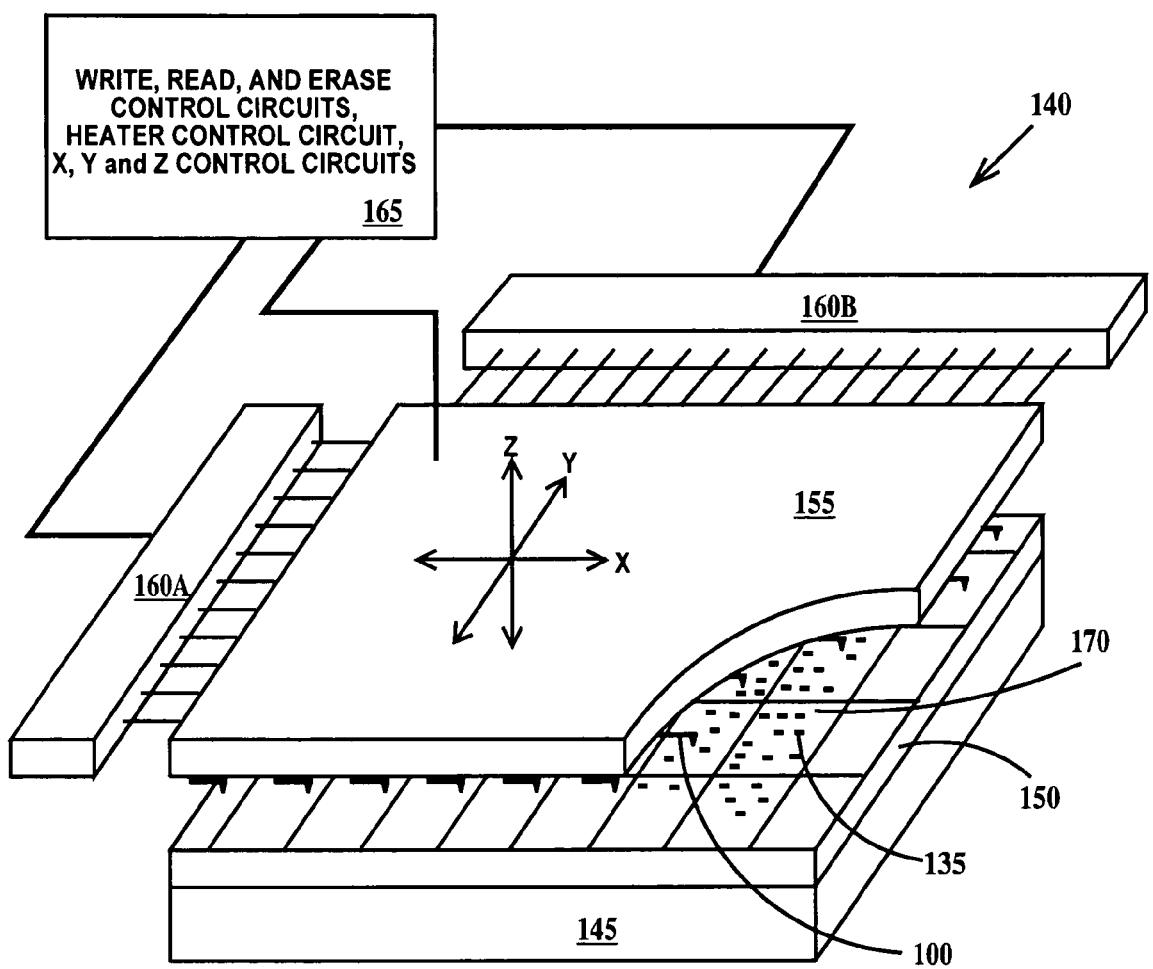
FIG. 2 is an isometric view of a local probe storage array including the data storage medium according to the embodiments of the present invention.

FIG. 2 is an isometric view of a local probe storage array 140 including the data storage medium according to the embodiments of the present invention. In FIG. 2, local probe storage array 140 includes substrate 145 having a cured polyaryletherketone resin layer 150 (similar to cured polyaryletherketone resin layer 130B of FIGS. 1A, 1B and 1C), which acts as the data-recording layer. An optional tip penetration stop layer may be formed between cured polyaryletherketone resin layer 150 and substrate 145. In one example, substrate 145 comprises silicon. Cured polyaryletherketone resin layer 150 may be formed by solution coating, spin coating, dip coating or meniscus coating uncured polyimide resin formulations and performing a curing operation on the resultant coating. In one example, cured polyaryletherketone resin layer 150 has a thickness between about 10 nm and about 500 nm and a root mean square surface roughness across a writeable region of cured polyimide resin layer 150 of less than about 1.0 nm across the cured polyimide resin layer. The composition of cured polyaryletherketone resin layer 150 is described infra. Positioned over cured polyaryletherketone resin layer 150 is a probe assembly 155 including an array of probe tip assemblies 100 (described supra). Probe assembly 155 may be moved in the X, Y and Z directions relative to substrate 145 and cured polyaryletherketone resin layer 150 by any number of devices as is known in the art. Switching arrays 160A and 160B are connected to respective rows (X-direction) and columns (Y-direction) of probe tip assemblies 100 in order to allow addressing of individual probe tip assemblies. Switching arrays 160A and 160B are connected to a controller 165 which includes a write control circuit for independently writing data bits with each probe tip assembly 100, a read control circuit for independently reading data bits with each probe tip assembly 100, an erase control circuit for independently erasing data bits with each probe tip assembly 100, a heat control circuit for independently controlling each heater of each of the probe tip assembles 100, and X, Y and Z control circuits for controlling the X, Y and Z movement of probe assembly 155. The Z control circuit controls a contact mechanism (not shown) for contacting the cured polyaryletherketone resin layer 150 with the tips of the array of probe tip assemblies 100.

During a write operation, probe assembly 155 is brought into proximity to cured polyaryletherketone resin layer and probe tip assemblies 100 are scanned relative to the cured polyaryletherketone resin layer. Local indentations 135 are formed as described supra. Each of the probe tip assemblies 100 writes only in a corresponding region 170 of cured polyaryletherketone resin layer 150. This reduces the amount of travel and thus time required for writing data.

During a read operation, probe assembly 155 is brought into proximity to cured polyaryletherketone resin layer 150 and probe tip assemblies 100 are scanned relative to the cured polyaryletherketone resin layer. Local indentations 135 are detected as described supra. Each of the probe tip assemblies 100 reads only in a corresponding region 170 of cured polyaryletherketone resin layer 150. This reduces the amount of travel and thus the time required for reading data.

During an erase operation, probe assembly 155 is brought into proximity to cured polyaryletherketone resin layer 150, and probe tip assemblies 100 are scanned relative to the cured polyaryletherketone resin layer. Local indentations 135 are erased as described supra. Each of the probe tip assemblies 100 reads only in a corresponding region 170 of cured polyimide resin layer 150. This reduces the amount of travel and thus time required for erasing data.

Additional details relating to data storage devices described supra may be found in the articles "The Millipede—More than one thousand tips for future AFM data storage," P. Vettiger et al., *IBM Journal of Research and Development*. Vol. 44 No. 3, May 2000 and "The Millipede—Nanotechnology Entering Data Storage," P. Vettiger et al.,

*IEEE Transaction on Nanotechnology*, Vol. 1, No, 1, March 2002. See also U.S. Patent Publication 2005/0047307, Published Mar. 3, 2005 to Frommer et al. and U.S. Patent Publication 2005/0050258, Published Mar. 3, 2005 to Frommer et al., both of which are hereby included by reference in their entireties.

Turning to the composition of cured polyaryletherketone resin layer 130B of FIGS. 1A through 1C. It should be understood that for the purposes of the present invention curing a polymer implies cross-linking the polymer to form a cross-linked polymer or resin.

The polyaryletherketone resin medium or imaging layer of the embodiments of the present invention advantageously meets certain criteria. These criteria include high thermal stability to withstand millions of write and erase events, low wear properties (low pickup of material by tips), low abrasion (tips do not wear out), low viscosity for writing, glassy character with no secondary relaxations for long data bit lifetime, and shape memory for erasability.

Cured polyaryletherketone resins according to embodiments of the present invention have high temperature stability while maintaining a low glass transition temperature (Tg). In a first example, cured polyaryletherketone resins according to embodiments of the present invention have a Tg of less than about 220° C. In a second example, cured polyaryletherketone resins according to embodiments of the present invention have a Tg of less than about 180° C. In a third example, cured polyaryletherketone resins according to embodiments of the present invention have a Tg of between about 150° C. and about 180° C. In a fourth example, cured polyaryletherketone resins according to embodiments of the present invention have a Tg of between about 100° C. and about 150° C.

Wear and erasability of the media were improved by cross-linking the polyimide oligomers without increasing the $T_g$, which was unexpected. By placing the cross-linking sites at the chain ends, the molecular weight between cross-links of polyaryletherketone polymer is predefined and therefore cross-linking was found to have a lesser effect upon the glass transition temperature than was previously thought.

Further control over the cross-link density was achieved by adding controlled amounts of reactive diluents described infra that enhance cross-linking. These reactive diluents formed a high density of cross-links that enhanced the wear properties of the polyimide medium without greatly increasing the Tg.

The glass transition temperature was adjusted for good write performance. To optimize the efficiency of the write process there should be a sharp transition from the glassy state to the rubbery state. A sharp transition allows the cured resin to flow easily when a hot tip is brought into contact and quickly return to the glassy state once the hot tip is removed. However, too high a $T_g$ leads to high write currents and damage to the probe tip assemblies described supra.

A formulation of polyaryletherketone polymer comprises one or more polyaryletherketone polymers and one or more reactive diluents. Each of the polyaryletherketone polymers has the structure:

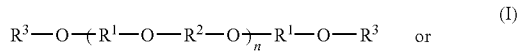  (I)

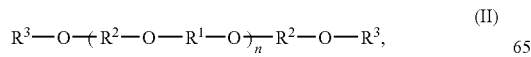  (II)

wherein $R^1$ is selected from the group consisting of

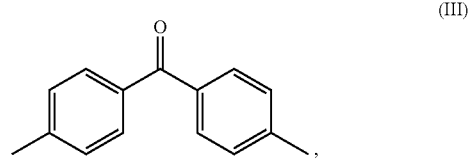  (III)

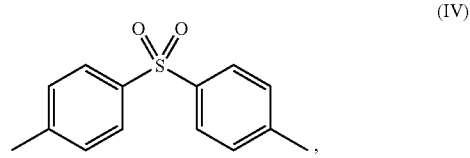  (IV)

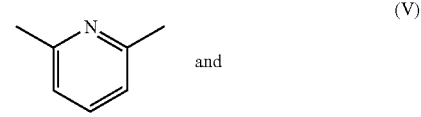  and  (V)

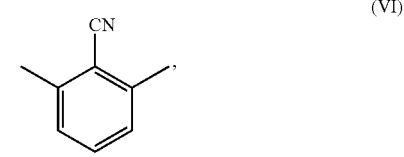  (VI)

wherein $R^2$ is selected from the group consisting of

  (VII)

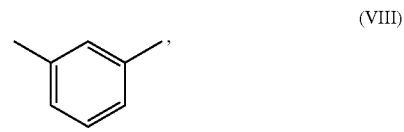  (VIII)

  (IX)

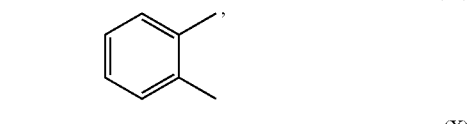  (X)

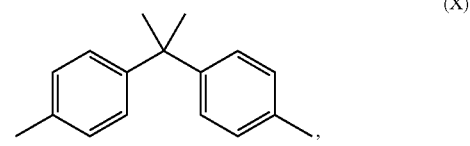  and  (XI)

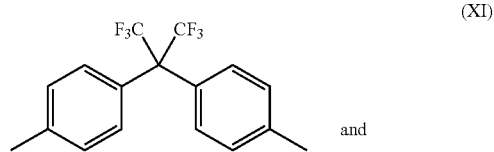  (XII)

wherein R³ is selected from the group consisting of mono (arylacetylenes) including:

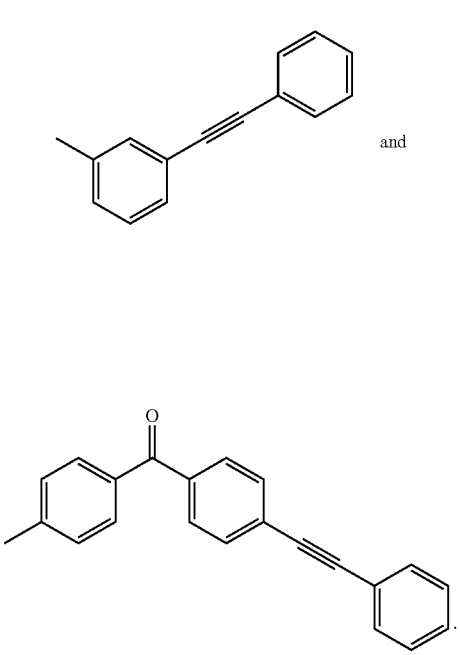

(XIII)

and (XIV)

In one example, polyaryletherketone polymers according to embodiments of the present invention advantageously have a molecular weight between about 1,000 Daltons and about 20,000 Daltons. (For the purpose of describing the present invention Daltons and grams/mole (g/mol) may be used interchangeably).

Each of the reactive diluents is selected from the group consisting of poly(arylacetylene)s including

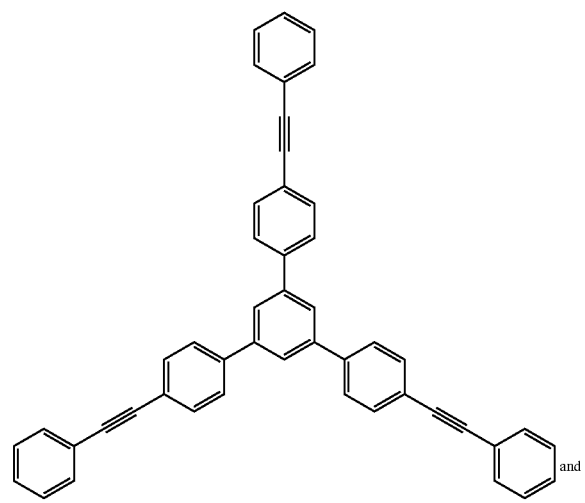

(XV)

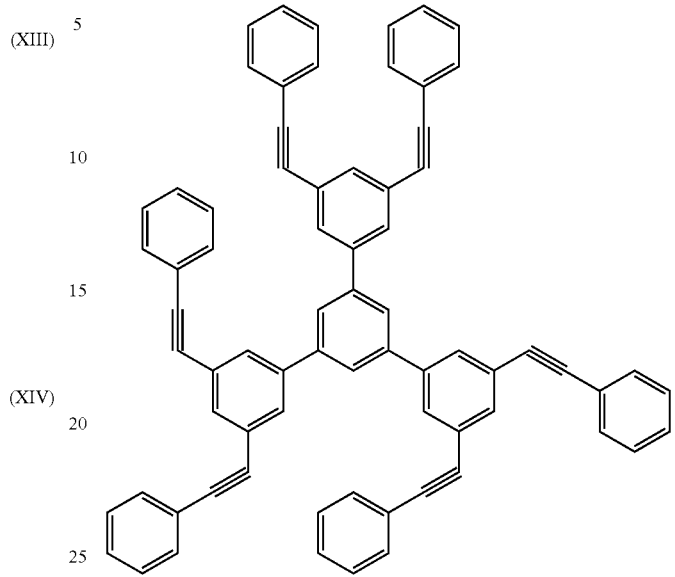

(XVI)

and poly(arylacetylene) ethers and poly(arylacetylene) poly ethers, including

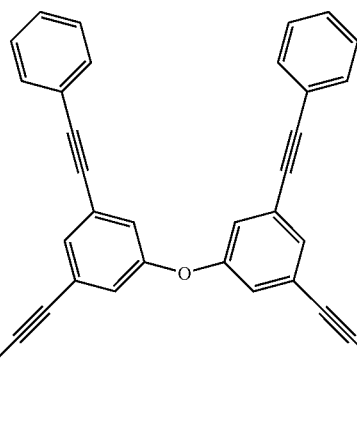

(XVII)

and

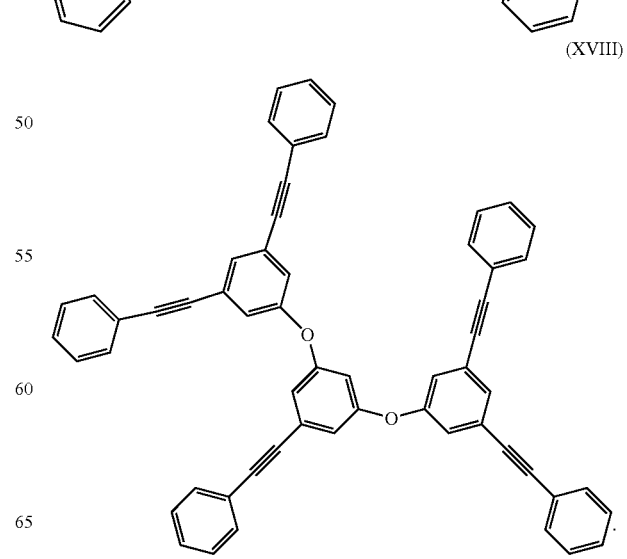

(XVIII)

In one example, reactive diluents according to embodiments of the present invention advantageously have a molecular weight greater than about 650 Daltons.

Figure 3:
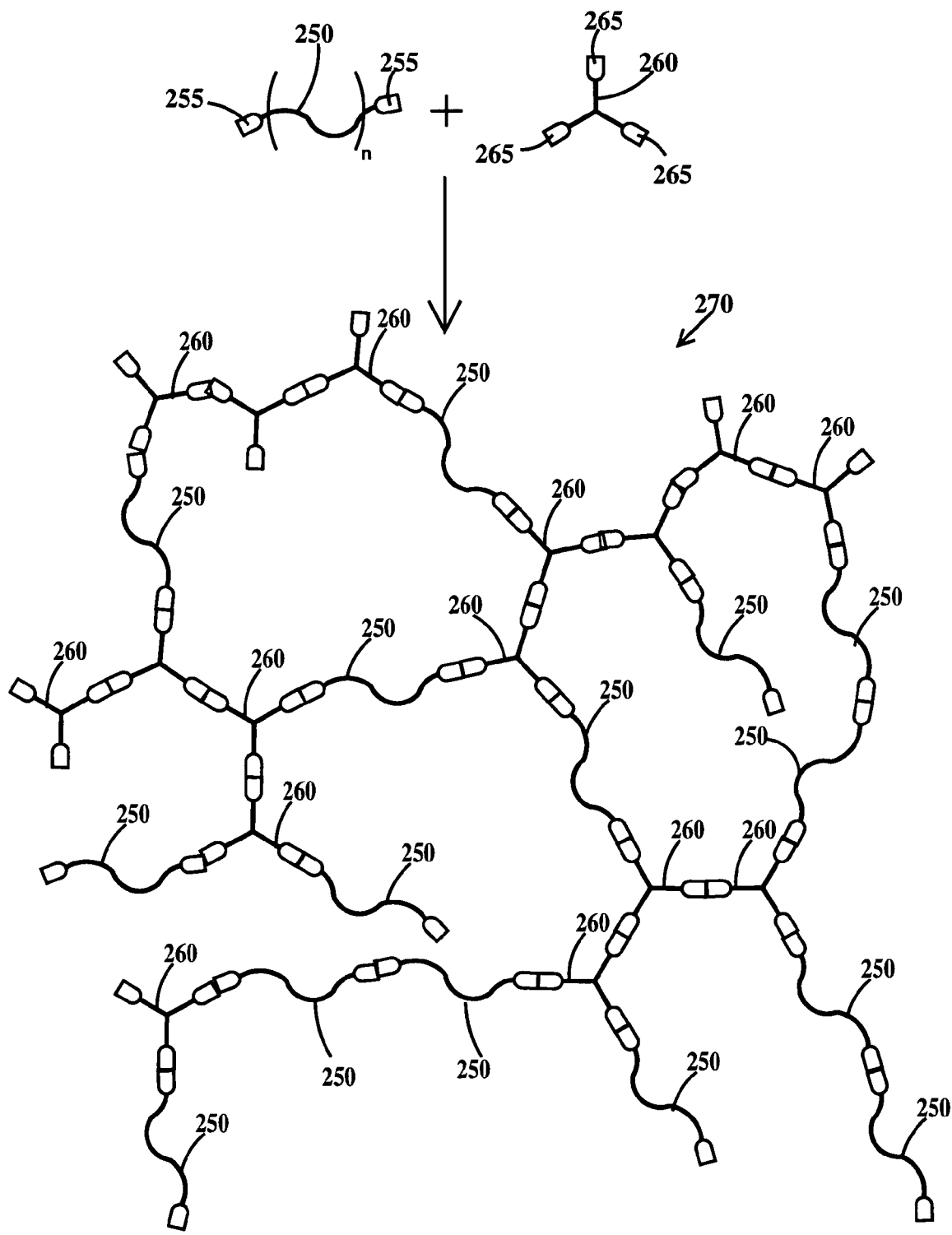
FIG. 3 is a diagram illustrating cross-linking of a polyaryletherketone polymer with a reactive diluent according to embodiments of the present invention.

The endgroups $R^3$ having the structures (XIII) and (XIV) react during thermal curing with the reactive diluents to cross-link the polyaryletherketone polymers into a polyaryletherketone resin. Note reactive diluent (XV) is an example of a reactive diluent that provides three cross-linking sites (as illustrated in FIG. 3), reactive diluent (XVII) is an example of a reactive diluent that provides four cross-linking sites, reactive diluent (XVIII) is an example of a reactive diluent that provides five cross-linking sites, and reactive diluent (XVI) is an example of a reactive diluent that provides six cross-linking sites. There is also some endgroup to endgroup linking in the cured resin.

In one example, reactive diluent derivatives comprise between about 20% by weight and about 40% by weight of the cured polyaryletherketone resin. In one example, curing is performed between about 250° C. and about 400° C.

FIG. 3 is a diagram illustrating cross-linking of a polyimide resin with a reactive diluent according to embodiments of the present invention. In FIG. 3, a mixture of (i) straight chain polyaryletherketone polymer 250 of repeating units n and having two reactive endgroups 255 (ii) a reactive diluent 260 having three reactive functionalities 265 is heat cured to produce a cross-linked polyaryletherketone resin 270. In polyaryletherketone resin 270, polyaryletherketone polymers 250 are linked to each other through respective reactive endgroups; polyaryletherketone polymers 250 are linked to reactive diluents 260 through respective reactive endgroups, and reactive diluents 260 are linked to each other through respective reactive endgroups. Although Tg is usually a function of molecular weight and cross-link density, in this case it is largely independent of the percentage by weight of reactive diluent in the polyaryletherketone polymer/reactive diluent mixture.

Synthesis Examples

All materials were purchased from Aldrich and used without further purification unless otherwise noted. Bisphenol-A, dihydroxyphenylether, 4,4'-difluorobenzophenone, and resorcinol were sublimed under vacuum.

Synthesis of the endgroup 3-(phenylethynyl)phenol (Structure XIII):

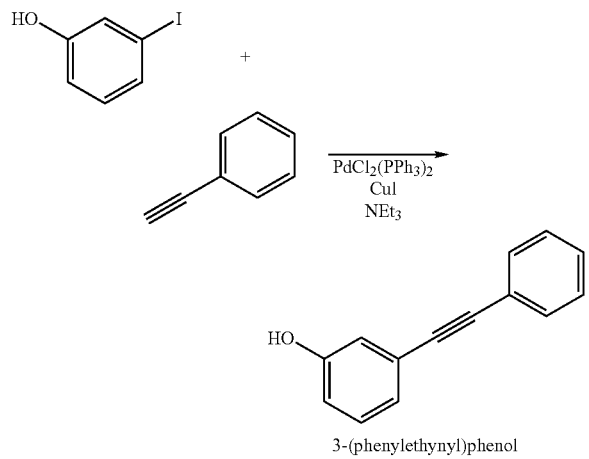

3-(phenylethynyl)phenol

3-Iodophenol (5.00 g, 22.7 mmol), bis(triphenylphopine) palladium(II) dichloride ($PdCl_2(PPh_3)_2$) (160 mg, 0.23 mmol, 1 mol %), $PPh_3$ (420 mg, 1.60 mmol, 7 mol %), and CuI (220 mg, 1.16 mmol, 5 mol %) were dissolved in triethylamine ($NEt_3$) (150 mL) and the resulting suspension was treated with three cycles of evacuation and refilling with $N_2$. Phenylacetylene (3.1 mL, 2.9 g, 28.4 mmol, 1.25 eq) was added by syringe, and the reaction mixture was again treated with three cycles of evacuation and refilling with $N_2$. The reaction mixture was then stirred and heated to 70° C. using an oilbath for 38 h. The reaction was cooled, and the excess $NEt_3$ was removed under reduced pressure. The remaining solids were extracted with 3×50 mL portions of diethyl ether, which were filtered and then evaporated. The crude product was purified by column chromatography (silica, 3:1 hexanes-ethyl acetate) to give 4.1 g of an orange solid. Further purification was accomplished by sublimation (100° C., 28 mTorr) to give 3-(phenylethynyl)phenol as a white solid (3.3 g. 75% yield).

Synthesis of the endgroup 4-fluoro-4'-(phenylethynyl)benzophenone (Structure XV):

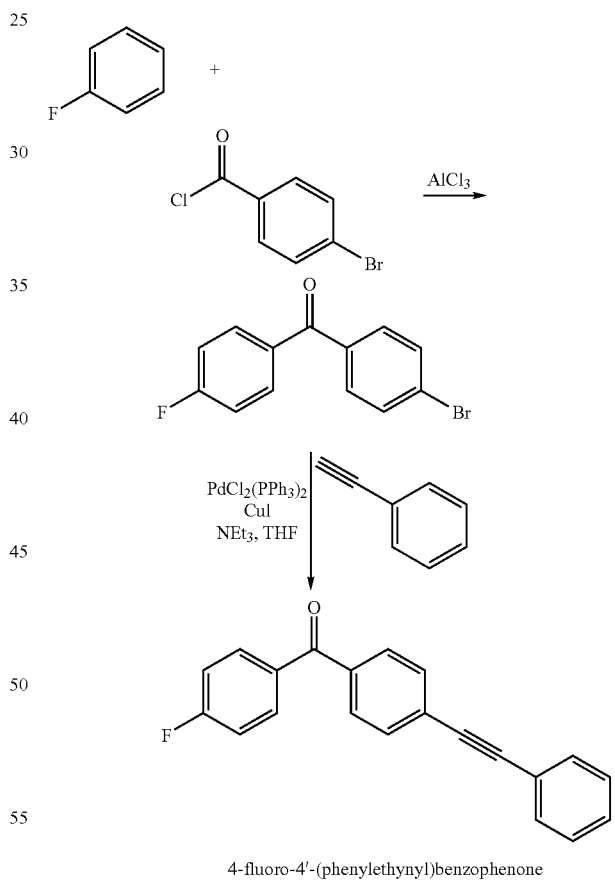

4-fluoro-4'-(phenylethynyl)benzophenone (i) 4-bromo-4'-fluorobenzophenone: fluorobenzene (6.89 g, 71.7 mmol), 4-bromobenzoyl chloride (7.86 g, 35.8 mmol), and aluminum chloride (4.78 g, 35.8 mmol) were combined and stirred for 24 h at room temperature. The resulting mixture was poured over ice, and then filtered. The solid was dissolved in hot ethanol, treated with decolorizing charcoal, and filtered; white crystals of the title compound formed upon cooling of the ethanol solution and were isolated by filtration.

(ii) In an inert atmosphere glovebox, 4-bromo-4'-fluorobenzophenone (10 g, 35.8 mmol), PdCl$_2$(PPh$_3$)$_2$ (250 mg), CuI (680 mg), phenylacetylene (4.02 g, 1.1 eq), triethylamine (3.6 g, 1 eq), and toluene (25 mL) were combined. The flask was closed and heated to 70° C. for 24 h. The mixture was poured over ice and extracted with methylene chloride, which was separated and evaporated. The residue was recrystallized twice from hot ethanol using decolorizing charcoal to give the title product as white crystals.

Example synthesis of a polyaryletherketone polymer (Structure XX):

7.24 (t, 2H). Bisphenol-A Polyaryletherketone: $^1$H NMR: δ (ppm) endcap signals=7.83 (s, 2H), 7.68 (d, 2H), 7.61 (s, 2H), 7.44 (b, 1H), 7.43 (b, 2H); backbone signals=7.80 (d, 2H), 7.33 (d, 2H), 7.08 (b, 2H), 7.05 (b, 2H), 1.74 (s, 6H)

Molecular weights were easily adjusted by using different proportions of monomers and endcaps and several different molecular weight polymers were prepared. Molecular weights, relative to polystyrene standards, were measured using a Waters 150 CV Plus Gel Permeation Chromatograph (GPC). The measurements were taken at room temperature using THF as the mobile phase in the column.

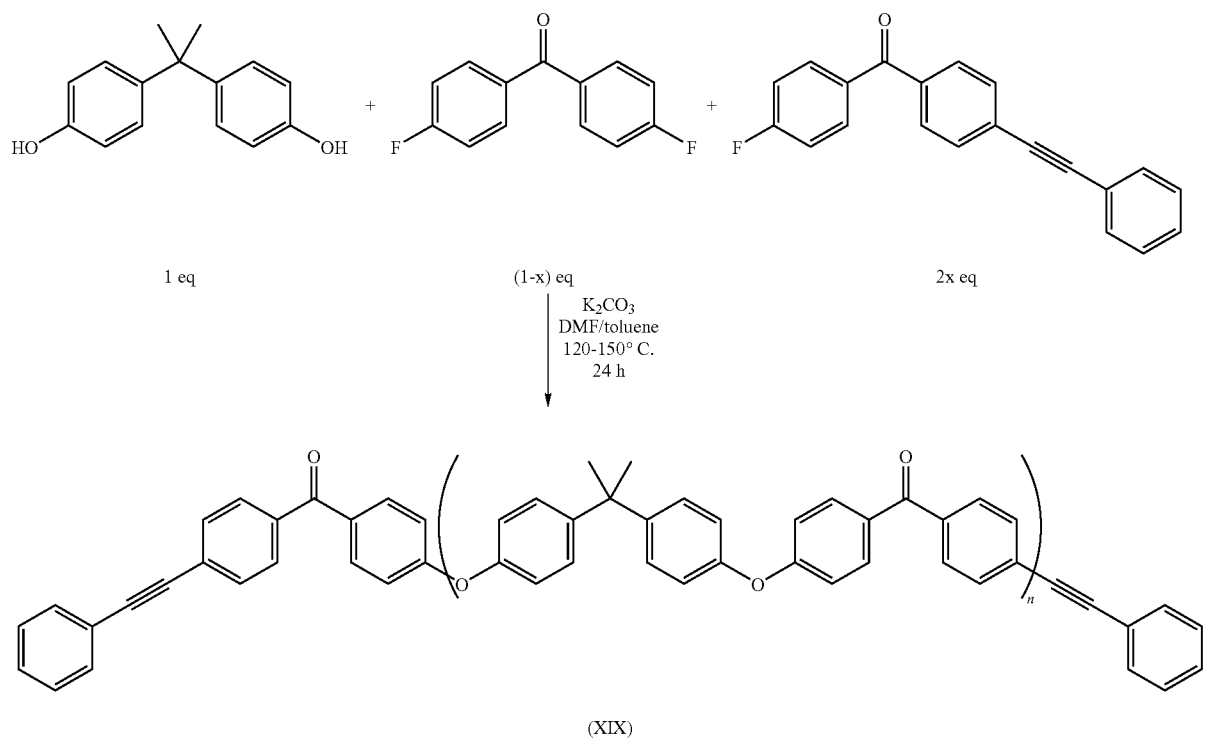

To a 100-mL, three necked, round-bottomed flask fitted with a nitrogen inlet, a Dean-Stark trap fitted with a condenser, and an overhead stirrer, 0.0098 mol of bisphenol-A, 0.02 mol anhydrous potassium carbonate, and varying amounts of 4,4'-difluorobenzophenone and 4-fluoro-4'-phenylethynylbenzophenone were added in different proportions, depending on the targeted molecular weight. Additionally, 60 mL of anhydrous DMF and 10 mL of anhydrous toluene were added and the reaction mixture was refluxed at 120° C. for 6-8 hours, then the reaction was subsequently brought to 140° C. for 8-10 hours, then the temperature was increased to 150° C. for the remainder of the 24-hour reaction period. Water, the reaction byproduct, was removed by azeotropic distillation with toluene. The product was precipitated in acidified methanol.

$^1$H nuclear magnetic resonance (NMR) spectra were acquired in deuterated DMSO or methylene chloride on the Bruker Avance 400 spectrometer. 4-fluoro-4'-phenylethynylbenzophenone: $^1$H NMR: δ (ppm)=7.87 (m, 2H), 7.81 (d, 2H), 7.69 (d, 2H), 7.61 (m, 2H), 7.44 (m, 1H), 7.43 (m, 2H),

TABLE I

Calculated Molecular Weight (Structure XX) by GPC and NMR

| Molecular Weight (g/mol) | $<M_n>$ by GPC (×10$^{-3}$ g/mol) | PDI (%) | $<M_n>$ by NMR (×10$^{-3}$ g/mol) |
| --- | --- | --- | --- |
| 4,000 | 6.3 | 1.55 | 3.9 |
| 8,000 | 13.3 | 1.63 | 6.7 |
| 16,000 | 25.5 | 1.75 | 9.6 |
| 32,000 | 39.2 | 1.58 | — |

Thermal decomposition of samples was recorded by the TA instruments Hi-Res TGA 2950 Thermogravimetric Analysis. Measurements were conducted in a nitrogen atmosphere at a heating rate of 10° C./min and samples were ultimately heated to 500° C. Thermal transitions were reported by the TA instruments DSC 2920 Differential Scanning Calorimeter. The samples were heated at a rate of 10° C./min with a temperature range of 350° C.

TABLE II

Thermal Data from DSC

| Composition and MW in (g/mol) | Tg (° C.) |
| --- | --- |
| Structure XIX, 4,000 | 154 |
| Structure XIX, 8,000 | 151 |
| Structure XIX, 16,000 | 154 |
| Structure XIX, 8,000 Mixed with Structure XVI but not cured | 151 |
| Structure XIX, 8,000 Mixed with 30% by weight Structure XVI and cured | 170 |

The glass transition temperatures of the compositions range from 151° C. for the 8,000 g/mol structure XIX polymer and uncured 8,000 g/mol structure XIX polymer mixed with reactive diluent structure XVII to 170° C. for the cured resin of 8,000 g/mol structure XX polymer mixed with 30% reactive diluent structure XVI.

For TGA, at 420° C., the cured resin of 8,000 g/mol structure XIX polymer mixed with 30% reactive diluent structure XVI had experienced 1% decomposition, and only 5% had decomposed after reaching a temperature at 490° C.

It can be concluded that polyaryletherketone resins according to embodiments of the present invention exhibit excellent thermal stability.

Swelling (as a percentage increase in volume) experiments were conducted to determine the solvent resistance properties of the cured polyaryletherketone resins. Swelling is important, because the process for fabricating storage devices described in FIGS. 1A, 1B, and 1C and 2 require the polyaryletherketone resin storage media be subjected to solvent cleaning procedures.

TABLE III

Thermal Data from DSC

| Composition and MW in (g/mol) | Swelling Results |
| --- | --- |
| Structure XIX, 4,000 | After 4 hours, 54% dissolved in THF After 4 hours 785% increase in volume in NMP |
| Structure XIX, 8,000 | Dissolved in less than 1 hour in both THF and NMP |
| Structure XIX, 16,000 | Dissolved in 10 minutes in THF Dissolved in 30 minutes in NMP |
| Structure XIX, 8,000 Mixed with Structure XVI and cured | After 24 hours, 18% increase in volume in THF After 24 hours, 6% increase in volume in NMP |

Without cross-linking with a reactive diluent, all structure XIX polyaryletherketone polymers dissolved in less than six hours. However, there was a trend of increased solvent resistance with increased endcap incorporation, as the 4,000 g/mol polymer was much more resistant than the 16,000 g/mol polymer with a lower cross-linking density. By contrast, the cured resin of 8,000 g/mol structure XIX polymer mixed with 30% reactive diluent structure XVI exhibit a minor increase in volume of 18% in THF and 6% in NMP after 24 hour immersion.

Thus, the embodiments of the present invention provide data storage and imaging methodologies that operate in the nanometer regime.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is;
1. A method, comprising:
bringing a thermal-mechanical probe into proximity with a layer of resin multiple times to induce deformed regions at points in said layer of said resin, said resin comprising one or more polyaryletherketone polymers cross-linked by one or more reactive diluent groups, said resin having a glass transition temperature of less than about 220° C., said thermal mechanical probe heated to a temperature of greater than about 100° C., said thermal mechanical probe heating said points in said layer of said resin and thereby writing information in said layer of said resin;
bringing said thermal-mechanical probe into proximity with said points to read said information;
bringing said thermal-mechanical probe into proximity with one or more of said deformed regions in said layer of said resin, said thermal mechanical point heated to a temperature of greater than about 100° C. and heating said one or more of said deformed regions, thereby deforming said one or more of said deformed regions in such a way as to eliminate said one or more deformed regions, thereby erasing said information;
repeatedly writing, reading and erasing information at said points in said layer of said resin;
wherein said resin has a glass transition temperature of less than about 220° C.;
wherein each of said one or more polyaryletherketone polymers has the structure:

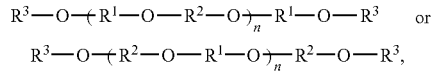

wherein $R^1$ is

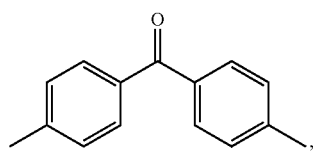

wherein R² is selected from the group consisting of

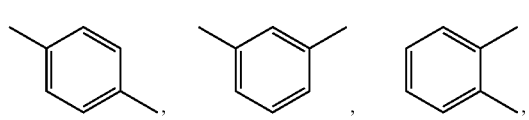

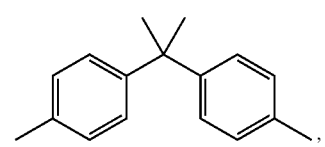

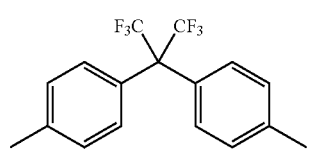

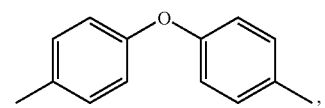

wherein R³ is selected from the group consisting of mono (arylacetylenes)

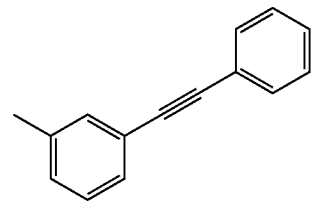

and

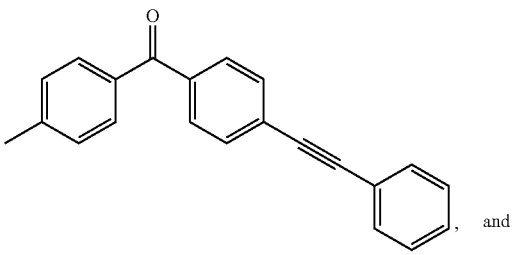

and wherein n is selected to provide a molecular weight for each of said one or more polyaryletherketone polymers from about 1000 Daltons to about 20,000 Daltons; and wherein each of said one or more reactive diluents is selected from the group consisting of poly(arylacetylenes),

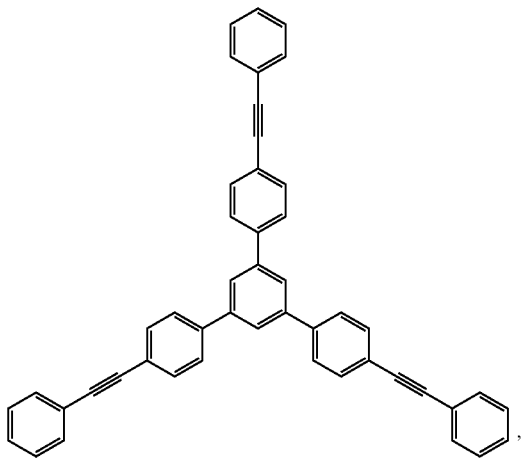

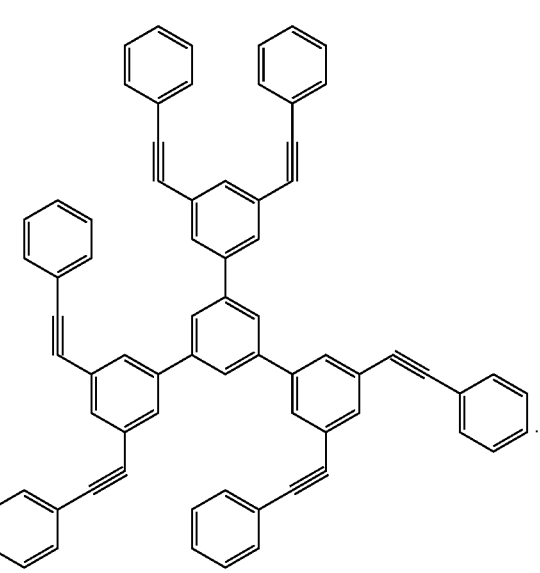

poly(arylacetylene) ethers, poly(arylacetylene) poly ethers,

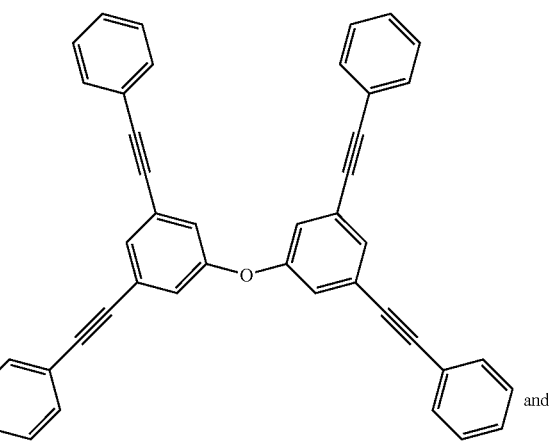

and

-continued

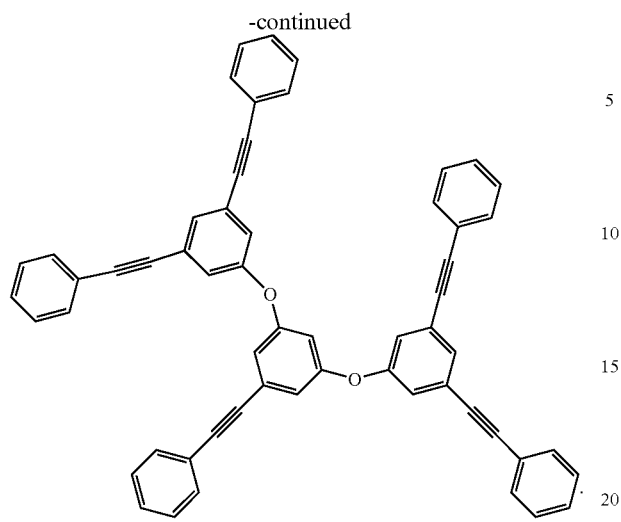

2. A method, comprising:

bringing a thermal-mechanical probe into proximity with a layer of resin multiple times to induce deformed regions at points in said layer of said resin, said resin comprising one or more polyaryletherketone polymers cross-linked by one or more reactive diluent groups, said resin having a glass transition temperature of less than about 220° C., said thermal mechanical probe heated to a temperature of greater than about 100° C., said thermal mechanical probe heating said points in said layer of said resin and thereby writing information in said layer of said resin; wherein each of said one or more polyarylehterketone polymers has the structure:

$$R^3-O-(R^1-O-R^2-O)_n-R^1-O-R^3 \quad \text{or} \quad (I)$$

$$R^3-O-(R^2-O-R^1-O)_n-R^2-O-R^3, \quad (II)$$

wherein R1 is

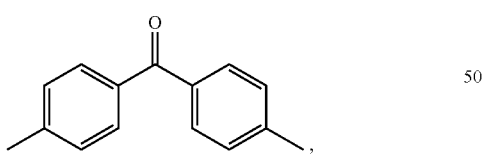

wherein R² is selected from the group consisting of

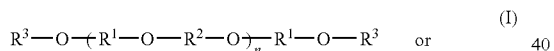

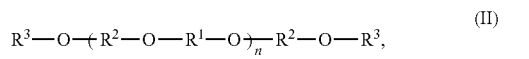

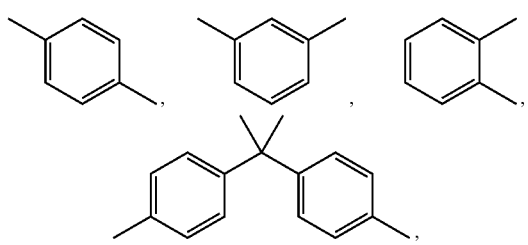

-continued

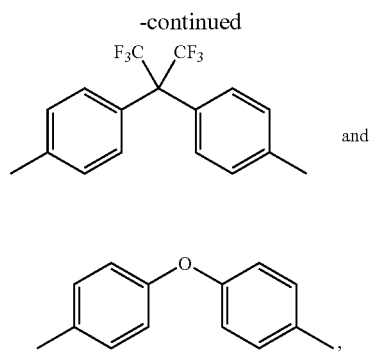
and wherein R³ is selected from the group consisting of mono (arylacetylenes)

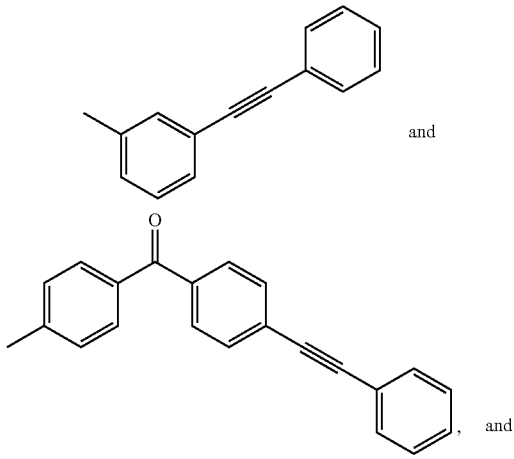
, and wherein n is selected to provide a molecular weight for each of said one or more polyaryletherketone polymers from about 1000 Daltons to about 20,000 Daltons; and wherein each of said one or more reactive diluents is selected from the group consisting of poly(arylacetylenes)

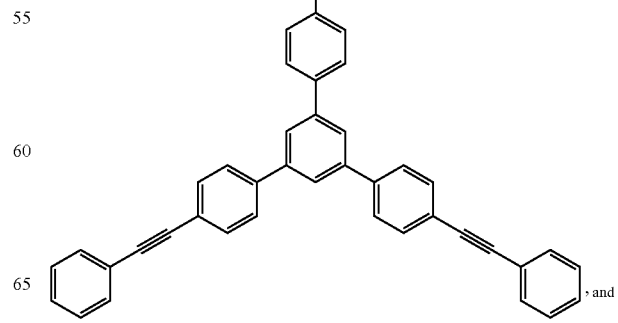
, and

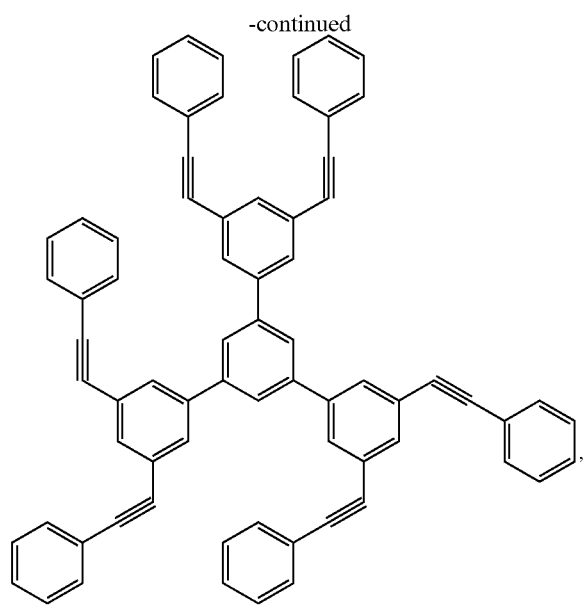

poly(arylacetylene) ethers, poly(arylacretylene) poly ethers

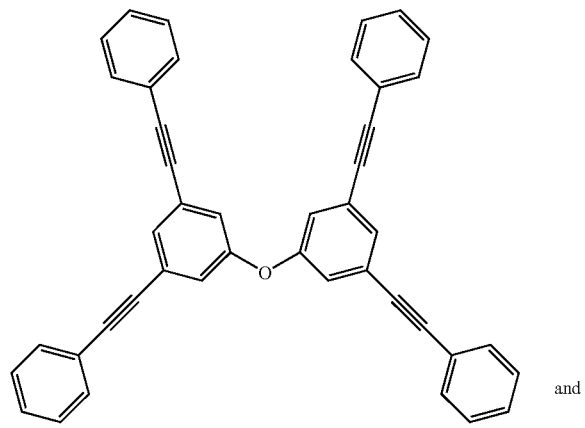

and

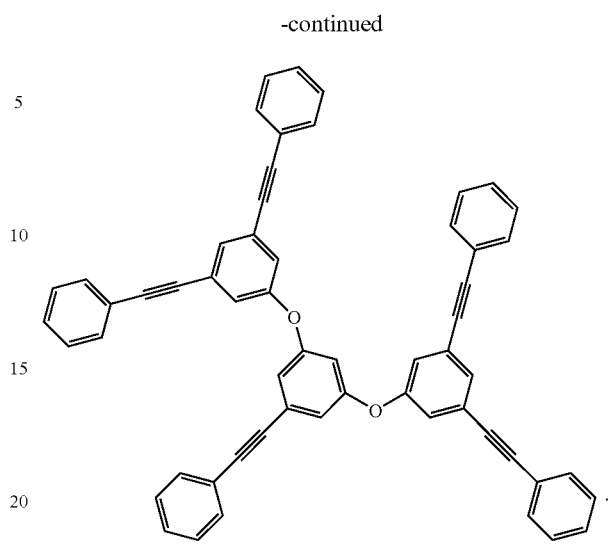

3. The method of claim 2, further including:

bringing said thermal-mechanical probe into proximity with said points to read said information.

4. The method of claim 3, further including:

bringing said thermal-mechanical probe into proximity with one or more of said deformed regions in said layer of said resin, said thermal mechanical point heated to a temperature of greater than about 100° C.; and heating said one or more of said deformed regions, thereby deforming said one or more of said deformed regions in such a way as to eliminate said one or more deformed regions, thereby erasing said information.

5. The method of claim 4, further including:

repeatedly writing, reading and erasing information at said points in said layer of said resin.

* * * * *